United States Patent
Kim

(10) Patent No.: US 10,229,613 B2
(45) Date of Patent: Mar. 12, 2019

(54) ALGORITHM TEACHING APPARATUS USING BLOCKS

(71) Applicant: Jin Wook Kim, Busan (KR)

(72) Inventor: Jin Wook Kim, Busan (KR)

( * ) Notice: Subject to any disclaimer, the term of this patent is extended or adjusted under 35 U.S.C. 154(b) by 300 days.

(21) Appl. No.: 15/107,354

(22) PCT Filed: May 6, 2015

(86) PCT No.: PCT/KR2015/004512
§ 371 (c)(1),
(2) Date: Jun. 22, 2016

(87) PCT Pub. No.: WO2015/170873
PCT Pub. Date: Nov. 12, 2015

(65) Prior Publication Data
US 2017/0004730 A1    Jan. 5, 2017

(30) Foreign Application Priority Data

May 7, 2014 (KR) .................. 10-2014-0054198
May 6, 2015 (KR) .................. 10-2015-0063073

(51) Int. Cl.
G09B 19/00        (2006.01)
G09B 5/00         (2006.01)
(Continued)

(52) U.S. Cl.
CPC ......... *G09B 19/0053* (2013.01); *A63H 11/00* (2013.01); *A63H 30/04* (2013.01); *G09B 1/30* (2013.01); *G09B 5/00* (2013.01)

(58) Field of Classification Search
CPC ......... G09B 19/0053; G09B 1/30; G09B 5/00
See application file for complete search history.

(56) References Cited

U.S. PATENT DOCUMENTS 4,712,184 A    12/1987 Haugerud
5,697,788 A    12/1997 Ohta
(Continued)

FOREIGN PATENT DOCUMENTS

CN        2857141        1/2007
CN        101908289      12/2010
(Continued)

OTHER PUBLICATIONS

Wang et al., "A Tangible Programming Tool for Children to Cultivate Computational Thinking", The Scientific World Journal, Feb. 2014.*
(Continued)

*Primary Examiner* — Eddy Saint-Vil
(74) *Attorney, Agent, or Firm* — Ladas & Parry, LLP

(57) ABSTRACT

The present invention relates to an algorithm teaching apparatus. More specifically, the present invention relates to an algorithm teaching apparatus that uses blocks that can be played with like toys by children and facilitates easy teaching of an algorithm. The apparatus is divided into an event region, an execution region and a condition region, wherein an event block mounting part of the event region and an execution block mounting part of the execution region are formed so as to have different shapes, thus facilitating efficient teaching of the basic principles of an algorithm to children.

16 Claims, 6 Drawing Sheets

(51) Int. Cl.
*G09B 1/30* (2006.01)
*A63H 30/04* (2006.01)
*A63H 11/00* (2006.01)

(56) References Cited

U.S. PATENT DOCUMENTS

| | | | | |
|---|---|---|---|---|
| 7,316,567 | B2* | 1/2008 | Hsieh | A63H 33/08 434/171 |
| 2005/0026537 | A1 | 2/2005 | Hsieh et al. | |
| 2008/0166946 | A1* | 7/2008 | Gallagher | A63H 17/06 446/428 |
| 2012/0122059 | A1* | 5/2012 | Schweikardt | G09B 19/00 434/118 |
| 2014/0297035 | A1* | 10/2014 | Bers | A63H 11/00 700/257 |

FOREIGN PATENT DOCUMENTS

| | | |
|---|---|---|
| CN | 102289981 | 12/2011 |
| CN | 102789713 | 11/2012 |
| CN | 103116286 | 5/2013 |
| CN | 203366587 | 12/2013 |
| JP | 2004-8442 | 1/2004 |
| JP | 2004-094073 A | 3/2004 |
| KR | 10-2002-0061186 A | 7/2002 |
| KR | 10-2003-0012488 A | 2/2003 |
| KR | 10-2003-0066839 A | 8/2003 |
| KR | 10-2006-0030653 | 4/2006 |
| KR | 10-1037901 | 5/2011 |
| WO | WO 03-012636 A1 | 2/2003 |

OTHER PUBLICATIONS

Horn et al., "Tangible programming and informal science learning: making TUIs work for museums", Proceedings of the 7th international conference on Interaction design and children, Jun. 11-13, 2008.*

Mcnerney, "Tangible programming bricks: An approach to making programming accessible to everyone". MS Thesis, MIT Media Lab, Feb. 2000.*

Wang et al., "E-Block: A Tangible Programming Tool with Graphical Blocks", Mathematical Problems in Engineering vol. 2013.*

Bers et al., Tangible Programming in Early Childhood, 2009 (Year: 2009).*

Bers et al., Teaching Partnerships: Early Childhood and Engineering Students Teaching Math and Science Through Robotics, 2005 (Year: 2005).*

Extended European Search Report dated Mar. 27, 2017 for European Patent Application No. 15788874.4.

Victoria Woollaston: "The gadget that teaches FOUR-year-olds how to program a computer—but costs 135 and parents need to build it themselves", Dec. 10, 2013 (Dec. 10, 2013), XP055354836, Retrieved from the Internet: URL:http://www.dailymail.co.uk/sciencetech/article-2520909/The-Primo-Cubetto-teaches-FOUR-year-olds-program-computer.html [retrieved on Mar. 14, 2017].

MyMail Online News: "Start them early Toy teaches programming skills from age four Mail Online", youtube, Dec. 10, 2013 (Dec. 10, 2013), p. 1 pp., XP054977220, Retrieved from the Internet: URL:https://www.youtube.com/watch?v=y6MurXaXGqA [retrieved on Mar. 15, 2017].

Timothy S. Mcnerney ED—Williamson Julie R. et al: "From turtles to Tangible Programming Bricks: explorations in physical language design", Personal and Ubiquitous Computing, Springer Verlag, London, GB, vol. 8, No. 5, Sep. 1, 2004 (Sep. 1, 2004), pp. 326-337, XP058201442, ISSN: 1617-4909, DOI: 10.1007/S00779-004-0295-6.

Arnan Sipitakiat et el: "Robo-Blocks", Proceedings of the $11^{th}$ International Conference on Interaction Design and Children, IDC. '12. Jan. 1, 2012 (Jan. 1, 2012), p. 98, XP055354799, New York, New York, USA, DOI: 10.1145/2307096.2307108, ISBN: 978-1-4503-1007-9.

Decision to Grant dated Aug. 13, 2018 for Japanese Patent Application No. 2016-566904 and its English translation by Global Dossier.

Office Action dated Oct. 6, 2017 for Japanese Patent Application No. 2016-566904 and its English translation by Global Dossier.

Decision to Grant dated Jul. 27, 2015 for Korean Patent Application No. 10-2015-0063073 and its English translation by Global Dossier.

Office Action dated Jun. 9, 2015 for Korean Patent Application No. 10-2015-0063073 and its English translation by Global Dossier.

First Search Report dated Jan. 5, 2018 for Chinese Patent Application No. 201580002800 and its English translation by Global Dossier.

Development of mobile robot's block-type tool for programming using ******, outside, and RFID, Japan Society of Mechanical Engineers robotics mechanics lecture meeting lecture collected papers (CD-ROM), Some or all of nonpatent literature that was shown may not be sent restriction of May 21, 2013 and ROMBUNNO 2P1-P03.

International Preliminary Report of Patentability (Chapter I) for PCT/KR2015/004512 dated Nov. 8, 2016 and its English translation from WIPO.

International Search Report for PCT/KR2015/004512 dated Jun. 24, 2015 and its English translation from WIPO.

Written Opinion of the International Searching Authority for PCT/KR2015/004512 dated Jun. 24, 2015 and its English translation from WIPO.

* cited by examiner

ALGORITHM TEACHING APPARATUS USING BLOCKS

TECHNICAL FIELD

The present disclosure relates to an algorithm teaching apparatus, and more particularly, to an algorithm teaching apparatus allowing children to learn algorithms subconsciously or naturally while playing with blocks like toys. The algorithm teaching apparatus has an event area, an execution area, and a condition area divided from each other, in which an event block mount in the event area has a different shape to that of an execution block mount in the execution area, such that the basic principles of algorithms can be easily and effectively taught to children.

BACKGROUND ART

For the development of application programs used in computers and smartphones, an education in programming languages, such as C language, is necessary. It is also necessary to teach algorithms able to logically demonstrate on which basis and rules a program or an application must be coded.

An education in algorithms is a process of learning a logical language, as well as a process of understanding which one has to be picked up and connected. Thus, it is important to teach the basic concepts of logical languages (e.g. how a loop operates, how to determine, how to calculate, how to acquire information that a computer provides, how to instruct a computer to work, and the like). It is also important to provide creative experiences and to provide learners with a sense of achievement about what they have created.

Such an education in algorithms can improve the logical thinking of children, and can help children to think creatively.

However, since most application programs are written in foreign languages, it is difficult to teach application programs to children. Error messages repeatedly activated due to simple errors, such as mixed uses or the omission of colons, semicolons, or the like, that may occur during the process of writing a program, may weaken the interest of children in algorithms, such that they may give up learning algorithms. In addition, conventional education in software is focused on the use of software. However, such a software education does not help children to compose the software algorithms that they need, which is problematic.

Therefore, an apparatus able to teach algorithms to children in an easy and interesting manner is urgently required.

DISCLOSURE

Technical Problem

Accordingly, the present disclosure has been made keeping in consideration of the above problems occurring in the conventional education in algorithms, and the present disclosure is intended to propose an algorithm teaching apparatus allowing children to learn algorithms subconsciously or naturally while playing with blocks like toys.

The present disclosure is also intended to propose an algorithm teaching apparatus having an event area, an execution area, and a condition area divided from each other, in which an event block mount in the event area has a different shape to that of an execution block mount in the execution area, such that children can easily and effectively understand the basic principles of algorithms.

The present disclosure is also intended to propose an algorithm teaching apparatus allowing an event block, an execution block, or a variable area mounted to be activated in synchronous with the sequence of the execution of a composed algorithm, whereby children can visually determine and debug algorithms composed by themselves.

Technical Solution

According to an embodiment, an algorithm teaching apparatus may include: an algorithm creating section having an event block for inputting an event command or an execution block for inputting an execution command mounted thereto; an algorithm control section controlling a robot by recognizing a command code of the event block or the execution block mounted to the algorithm creating section and combining the event block and the execution block; and a communications section transmitting a control signal of the algorithm control section to the robot via a wired/wireless medium The algorithm creating section may include: an event area having an event block mount to which the event block for inputting the event command is mounted; and an execution area having an execution block mount to which the execution block is mounted, the execution block inputting the execution command corresponding to the event command of the event block mounted to the event block mount.

It is preferable that the execution block mount for inputting the execution command subordinate to the event command of the event block mounted to the event block mount is allocated to the execution area. The execution block mount allocated to the execution area may include at least one execution block mount.

The algorithm creating section may further include a variable area to be activated in one of on and off states in order to realize a condition command, thereby displaying a condition.

The event block mount may have a first recess in which the event block is seated. The execution block mount may have a second recess in which the execution block is seated. The first recess and the second recess have different shapes such that the event block and the execution block having different shapes are seated therein.

The event block mount may include an event block connector to which the event block is connected, the event block connector determining a mounting state of the event block or acquiring the event command from the event block. The execution block mount may include an execution block connector to which the execution block is connected, the execution block connector determining a mounting state of the execution block or acquiring the execution command from the execution block.

The algorithm control section may include: a block-identifying section identifying the event block mounted to the event block mount or the execution block mounted to the execution block mount and subordinate to the event block; a command-recognizing section recognizing the event command of the identified event block or the execution command of the execution block subordinate to the identified event block and mounted to the execution block mount; and an execution control section. When the event command of the identified event block has been satisfied, the execution control section generates a control signal and transmits the control signal to the robot such that the robot executes the execution command of the execution block subordinate to the identified event block and mounted to the execution block mount.

The algorithm control section may further include an operation state output section. When the event command or the execution command corresponding to the event command is executed, the operation state output section is synchronized with the event command or the execution command and sequentially activates the event block corresponding to the event command or the execution block corresponding to the execution command, thereby output-controlling an operating state of the event command or the execution command.

The algorithm teaching apparatus may further include: the event block to be mounted to the event block mount of the algorithm creating section to input the event command; and the execution block to be mounted to the execution block mount of the algorithm creating section to input the execution command.

The event blocks may have a text or an image marked on predetermined surfaces thereof, the text or the image corresponding to the event command. The execution blocks may have a text or an image marked on predetermined surface thereof, the text or the image corresponding to the execution command.

According to another embodiment, an algorithm teaching apparatus may include a body and algorithm blocks. The body includes: an algorithm creating section including an event area having an event block mount to which an event block is mounted and an execution area having an execution block mount to which an execution block for inputting an execution command corresponding to an event command of the event block is mounted; an algorithm control section controlling a robot by recognizing a command code of the event block mounted to the event block mount or a command code of the execution block mounted to the execution block mount and combining the event block and the execution block; and a communications section transmitting a control signal of the algorithm control section to the robot via a wired/wireless medium.

The algorithm blocks include the event block to be mounted to the event block mount to input the event command and the execution block to be mounted to the execution block mount to input the execution command.

When the event command or the execution command corresponding to the event command is executed, the algorithm control section may be synchronized with the event command or the execution command and sequentially activate the event block corresponding to the event command or the execution block corresponding to the execution command, thereby output-controlling an operating state of the event command or the execution command.

It is preferable that the event block mount or the execution block mount includes an output section synchronized with the event command or the execution command to output an operating state in response to the output-controlling of the algorithm control section, thereby allowing the operating state of the event command or the execution command to be visually determined.

It is preferable that the event block or the execution block includes an output section to output an operating state in response to the output-controlling of the algorithm control section, thereby allowing the operating state of the event command or the execution command to be visually determined.

According to a further embodiment, an algorithm teaching apparatus may include:

a robot;

a body, wherein the body including: an algorithm creating section including an event area having an event block mount to which an event block for inputting an event command is mounted and an execution area having an execution block mount to which an execution block for inputting an execution command corresponding to the event command of the event block is mounted; an algorithm control section controlling a robot by recognizing a command code of the event block mounted to the event block mount or a command code of the execution block mounted to the execution block mount and combining the event block and the execution block; and a communications section transmitting a control signal of the algorithm control section to the robot via a wired/wireless medium; and algorithm blocks including the event block to be mounted to the event block mount to input the event command and the execution block to be mounted to the execution block mount to input the execution command.

The robot may include: a sensor detecting the event command; and a driving unit realizing the execution command.

Advantageous Effects

The algorithm teaching apparatus according to the present disclosure has the following effects:

First, the algorithm teaching apparatus according to the present disclosure allows algorithms to be composed using blocks, such that children can learn algorithms subconsciously or naturally while playing with blocks like toys.

Second, the algorithm teaching apparatus according to the present disclosure has the event area, the execution area, and the condition area divided from each other, in which the execution area subordinate to the event area is allocated, with the event block mount in the event area having a different shape to that of the execution block mount in the execution area. Accordingly, children can easily and effectively understand the basic principles of algorithms.

Third, the algorithm teaching apparatus according to the present disclosure activates the event block, the execution block, or the variable area mounted in synchronous with the sequence of the execution of a composed algorithm, whereby children can visually determine and debug algorithms composed by themselves.

MODE FOR INVENTION

Hereinafter, reference will be made in detail to an algorithm teaching apparatus according to the present disclosure in conjunction with the accompanying drawings.

Figure 1:
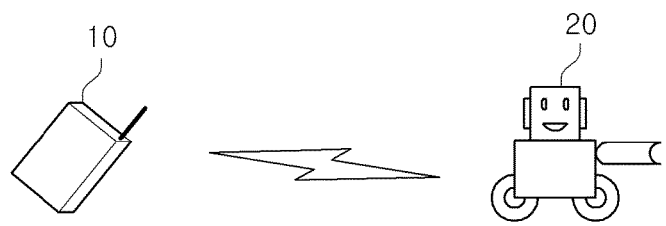
FIG. 1 is a diagram illustrating an algorithm teaching system according to the present disclosure.

FIG. 1 is a diagram illustrating an algorithm teaching system according to the present disclosure.

Described in greater detail with reference to FIG. 1, the algorithm teaching system includes a robot 20 and a body 10 performing wireless or wired communications with the robot 20. The body 10 generates control signals for controlling the operations of the robot 20 and transmits control signals to the robot 20.

A user creates an algorithm by inserting an event block (not shown) or an execution block (not shown) into the body 10 or using a variable area. The body 10 recognizes an event command, an execution command, or a condition corresponding to the event block, the execution block, or the variable area inserted thereinto, and controls the operation of the robot 20 based on a combination of an event command code, an execution command code, or the condition.

In an embodiment of the present disclosure, the body 10 compiles an algorithm based on a combination of the event command code, the execution command code, or the condition by recognizing the event command, the execution command, or the condition corresponding to the event block, the execution block, or the variable area, and when the event command is satisfied, generates a control signal for control over execution of the execution command or the condition subordinate to the event command and transmits the control signal to the robot 20.

In another embodiment of the present disclosure, the body 10 transmits a combination of the event command code, the execution command code, or the condition to the robot 20 by recognizing the event command, the execution command, or the condition corresponding to the event block, the execution block, or the variable area. The robot 20 compiles an algorithm based on the event command code, the execution command code, or the condition that is received, and when the event command is satisfied, generates a control signal for control over execution of the execution command or the condition subordinate to the event command.

The robot 20 includes a sensor for detecting external conditions, such as a light sensor or a sound sensor, and a driving unit for moving the robot 20.

In an embodiment of the present disclosure, the robot 20 transmits a detection signal to the body 10 upon detecting light or sound using the sensor. The body 10 generates a control signal for driving the robot 20 based on the detection signal, and transmits the control signal to the robot 20. Here, the execution command is executed using the control signal by determining whether or not the event command has been satisfied using the detection signal. For example, in an algorithm "Drive forwards when light is detected," the phrase "when light is detected" corresponds to the event command, and the phrase "Drive forwards" corresponds to the execution command. Thus, when a detection signal indicative of the detection of light is received, it is determined that the event command has been satisfied, and a command signal for execution of the execution command to drive forwards is generated and transmitted to the robot 20.

In another embodiment of the present disclosure, when the robot 20 detects light or sound using the sensor, the robot 20 generates a control signal for execution of the execution command, thereby controlling the driving thereof.

Figure 2:
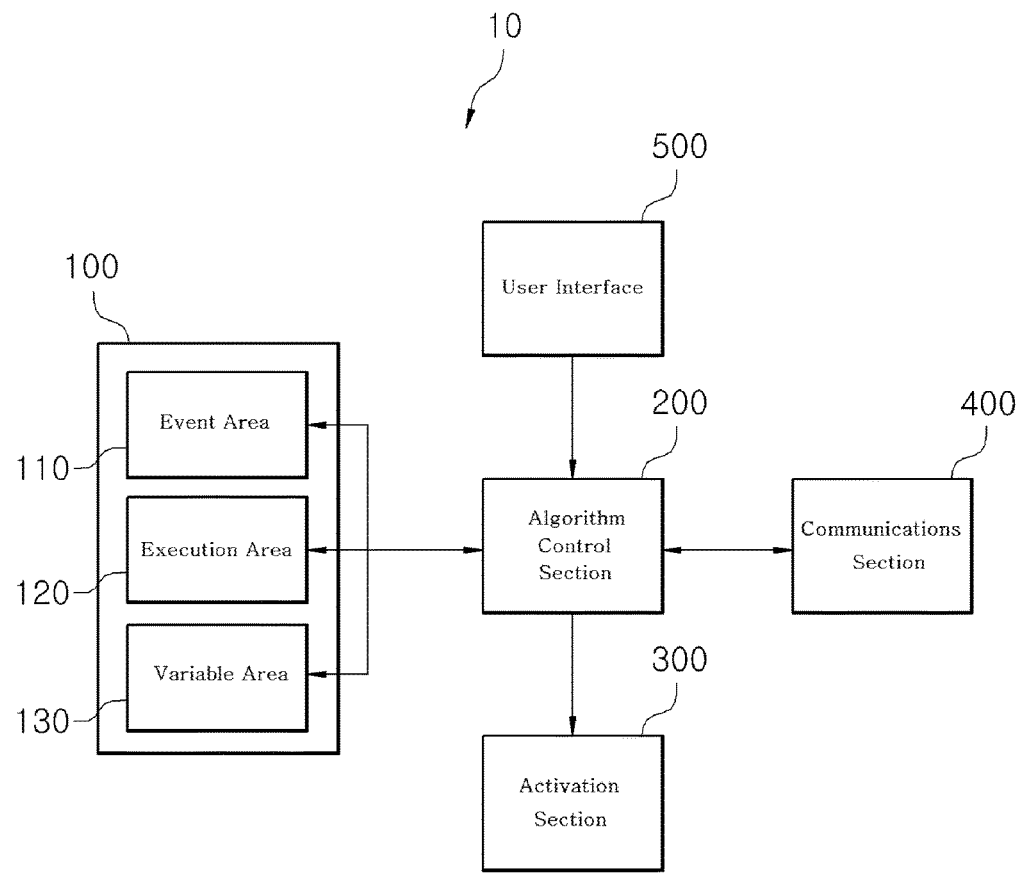
FIG. 2 is a functional block diagram more specifically illustrating the body according to the present disclosure.

FIG. 2 is a functional block diagram more specifically illustrating the body according to the present disclosure.

Described in greater detail with reference to FIG. 2, the body according to the present disclosure includes an algorithm creating section 100 for composing an algorithm, an algorithm control section 200, and a communications section 400. Event blocks for inputting event commands or execution blocks for inputting execution commands are mounted to the algorithm creating section 100. The algorithm control section 200 controls the operation of the robot by recognizing command codes of the event blocks or the execution blocks mounted to the algorithm creating section 100 and combining the event blocks, the execution blocks, or the variable area displaying conditions. The communications section 400 transmits control signals to the robot via a wired/wireless medium.

The algorithm creating section 100 includes an event area 110 having event block mounts to which the event blocks are mounted, an execution area 120 having execution block mounts to which the execution blocks are mounted, and a variable area 130 that is activated in one of on and off states in order to realize condition commands. The event area 110, the execution area 120, and the variable area 130 are divided from each other.

At least one event block mount is formed in the event area 110. At least one execution block mount subordinate to the event block mount is formed in the execution area 120. An execution command corresponding to an event command of the event block mounted to the event block mount is input into the at least one execution block mount. Thus, an algorithm is composed using an event block mounted to the event block mount and at least one execution block subordinate and corresponding to the mounted event block. When the event command of the event block is satisfied, execution commands of the execution blocks subordinate to the event block are sequentially executed.

Each of the event block mounts has an event block connector to which the event block is connected. The event block connector determines whether or not the event block is mounted to the event block mount or acquires an event command from the event block. Each of the execution block mounts has an execution block connector to which the execution block is connected. The execution block connector determines whether or not the execution block is mounted to the execution block mount or acquires an execution command from the execution block.

It is preferable that the event block connector includes a plurality of first mount-side connecting terminals to which block-side connecting terminals formed on the event block are to be connected. It is preferable that the execution block connector includes a plurality of second mount-side connecting terminals to which block-side connecting terminals formed on the execution block are to be connected.

Here, the variable area allows conditions to be added to the execution command. The variable area has at least one on/off activation section to display conditions. The activation sections may be implemented as light-emitting diode (LED) sections that are turned on and off. An algorithm may be composed by adding a condition "when an LED section is activated" to an execution command.

The algorithm control section 200 generates a control signal to control a robot by compiling an algorithm using a combination of a command code corresponding to an event command of an event block mounted to the event block mount of the event area 110, a command code corresponding to an execution command of an execution block mounted to the execution block mount of the execution area 120, a command code corresponding to the event command set by recognizing the condition of the variable area, a command code corresponding to the execution command, or conditions of the variable area.

The algorithm control section 200 determines whether or not an event command has been satisfied by receiving a detection signal from the robot through the communications section 400, and when the event command has been satisfied, generates a control signal to execute an execution command subordinate to the event command.

Here, the algorithm control section 200 may simply transmit a control signal to the robot without compiling an algorithm such that the robot compiles the algorithm. Here, the control signal provides the robot with a command code corresponding to an event command and a command code corresponding to an execution command.

When the event command or the execution command is sequentially executed according to the composed algorithm, the algorithm control section 200 is synchronized with the event command or the execution command that is being executed, and controls an event block or an execution block corresponding to the event command or the execution command to be activated. An activation section 300 activates the event block or the execution block in response to an activation control signal from the algorithm control section 200.

Here, the activation section 300 is disposed on the event block mount or disposed on the execution block mount to activate the event block or the execution block that is being executed. For example, the activation section 300 is an LED disposed on the event block mount or an execution block mount.

The activation section 300 may be disposed on the event block or the execution block instead of being disposed on the event block mount or the execution block mount. The activation section disposed on the event block or the execution block is activated in response to the activation control signal.

It is preferable that the event block or the execution block is formed of a transparent material. A text or image visually indicating the event command or the execution command is formed on one surface of the event block or the execution block.

With the activation section 300 as described above, children can visually indicate the event command and the execution command that sequentially operate according to a composed algorithm. In addition, with the activation section 300, children can more easily understand the operation of the composed algorithm. Furthermore, the activation section 300 allows children to determine whether or not algorithms that they have composed have an error. Thus, with the activation section 300, children can be naturally taught with a program debugging operation.

A user interface 500 is a means allowing user commands to be input. For example, the user interface 50 may input a user command to select an activation mode of an event block or an execution block or may input a user command to operate the robot according to a composed algorithm. A variety of user interfaces for inputting user commands may be used in the technical field to which the present disclosure pertains, without departing from the scope of the present disclosure.

Figure 3:
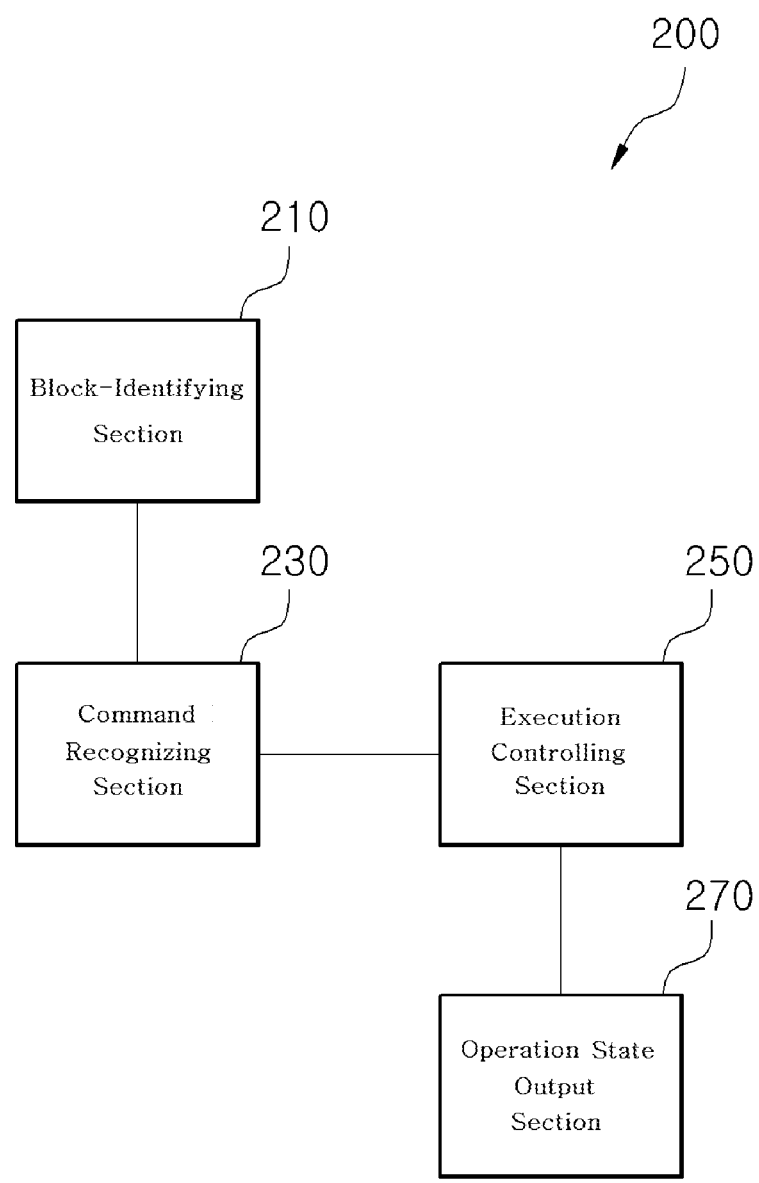
FIG. 3 is a functional block diagram illustrating the algorithm control section according to the present disclosure.

FIG. 3 is a functional block diagram illustrating the algorithm control section according to the present disclosure.

Described in greater detail with reference to FIG. 3, a block-identifying section 210 identifies an event block mounted to an event block mount or an execution block mounted to an execution block mount and subordinate to the event block. When the event block is mounted to the event block mount, the block-identifying section 210 identifies the event block mounted to the event block mount through the event block connector. When the execution block is mounted to the execution block mount, the block-identifying section 210 identifies the execution block mounted to the execution block mount through the execution block connector.

It is preferable that the event block is configured such that a plurality of event commands can be input thereto, and has an event selection button with which one event command from among the plurality of event commands can be selected. The block-side connecting terminals of the event block are changed by the event selection button, and the block-identifying section 210 can identify the event block based on the changed block-side connecting terminals. In the same manner, the execution block is configured such that a plurality of execution commands can be input thereto, and has an execution command selection button with which one execution command from among the plurality of execution commands can be selected. The block-side connecting terminals of the execution block is changed by the execution command selection button, and the block-identifying section 210 can identify the execution block based on the changed block-side connecting terminals.

It is more preferable that the event block or the execution block has a user interface allowing user commands to be input. Here, the user interface may be an event selection button with which one event command from among a plurality of event commands can be selected or a button with which an operation condition can be input. Here, the operation condition may refer to a time, date, point in time, or the like at which an execution command is executed. For example, in the case in which an event command and an execution command to control a first lamp to be turned on and a second lamp to be turned off at 9 p.m. are input, 9 p.m. may be input to the event command of the event block via the user interface.

A command-recognizing section 230 recognizes the event command of the identified event block or the execution command of the execution block subordinate to the identified event block and mounted to the execution block mount. The command-recognizing section 230 recognizes the event command of the event block mounted via the event block connector or the execution command of the execution block mounted via the execution block connector. The event block connector includes a plurality of first mount-side connecting terminals. The event block has block-side connecting terminals to be differently connected to the plurality of first mount-side connecting terminals according to event commands. The command-recognizing section 230 can recognize event commands based on the number and positions of block-side connecting terminals of event blocks connected to the mount-side connecting terminals. In the same manner, the command-recognizing section 230 may recognize execution commands based on the number and positions of block-side connecting terminals of execution blocks connected to second mount-side connecting terminals.

When the event command of the identified event block has been satisfied, an execution control section 250 generates a control signal to execute the execution command of the execution block subordinate to the identified event block and mounted to the execution block mount. Here, the event command is characterized as being a detection signal received from the robot or a command function composed by a user.

In addition, when the event command or the execution command corresponding to the event command is executed, an operation state output section 270 is synchronized with the event command or the execution command and sequentially activates the event block corresponding to the event command or the execution block corresponding to the execution command, thereby output-controlling the operating state of the event command or the execution command.

Figure 4:
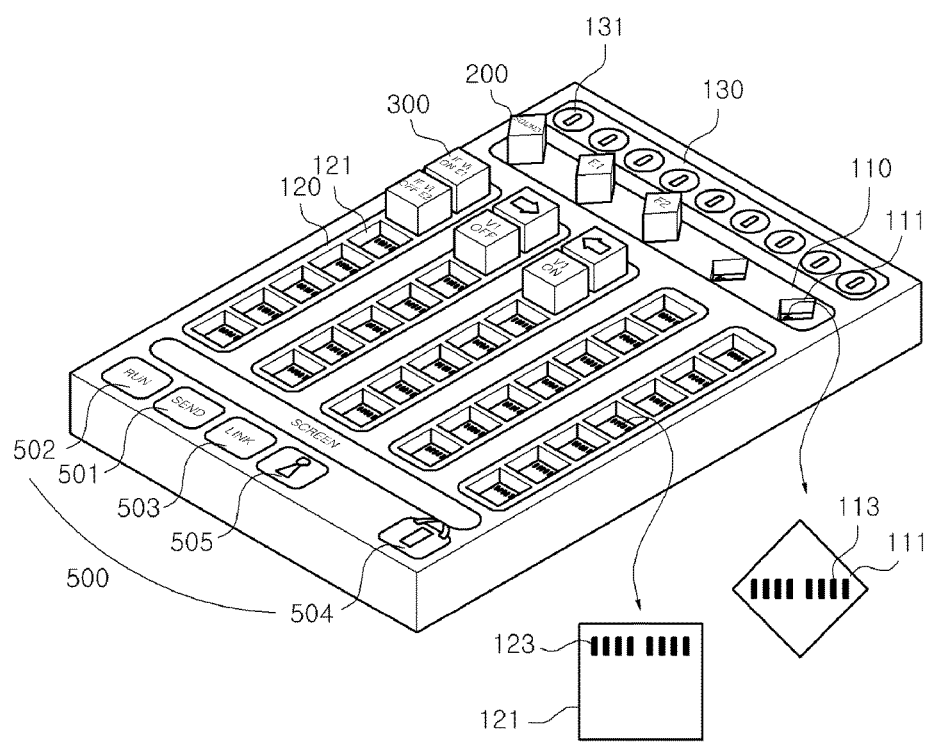
FIG. 4 is a view illustrating an exemplary body according to the present disclosure.

FIG. 4 is a view illustrating an exemplary body according to the present disclosure.

Described in greater detail with reference to FIG. 4, the variable area 130 is provided on the upper portion of the body, the event area 110 having event block mounts 111 is provided below the variable area 130, and the execution area 120 having execution block mounts 121 is provided below the event area 110. Here, the variable area 130 includes a plurality of LEDs that are activated on and off to display conditions.

The user interface 500 is disposed below the execution area 120. The user interface 500 includes a variety of buttons with which user commands are input.

The event area 110 may have a plurality of event block mounts 111 to which a plurality of event blocks are to be mounted. The execution area 120 may have a plurality of execution block mounts 121 subordinate to the event block mounts 111, such that a plurality of execution blocks are mounted to the execution block mounts 121. For example, a first line of the execution area 120 is subordinate and allocated to the first event block mount of the event area 110, and a second line of the execution area 120 is subordinate and allocated to the second event block mount of the event area 110.

Here, each of the event block mounts 111 has a first recess (not shown) in which an event block is seated, and each of the execution block mounts 121 has a second recess (not shown) in which an execution block is seated. The first recess and the second recess are characterized as having different shapes such that the event block and the execution blocks having different shapes are seated therein.

When an event block is mounted to one of the event block mounts 111, block-side connecting terminals formed on the event block is connected to first mount-side connecting terminals 113 formed on the event block mount 111. In the same manner, when an execution block is mounted to one of the execution block mounts 121, block-side connecting terminals formed on the execution block are connected to second mount-side connecting terminals 123 formed on the execution block mount 121.

The user composes an algorithm by mounting event blocks to the event block mounts 111, mounting execution blocks to the execution block mounts 121, or inputting conditions using LEDs in the variable area.

After the user has completed the composition of the algorithm, when an operation execution command is input via a user interface 142, the composed algorithm is executed. When an activation command is input via a user interface 144, an LED or an LED sequentially disposed in the position of the event block or in the position of the execution block, synchronized with the event command or the execution command performed according the composed algorithm, is activated.

Figure 5:
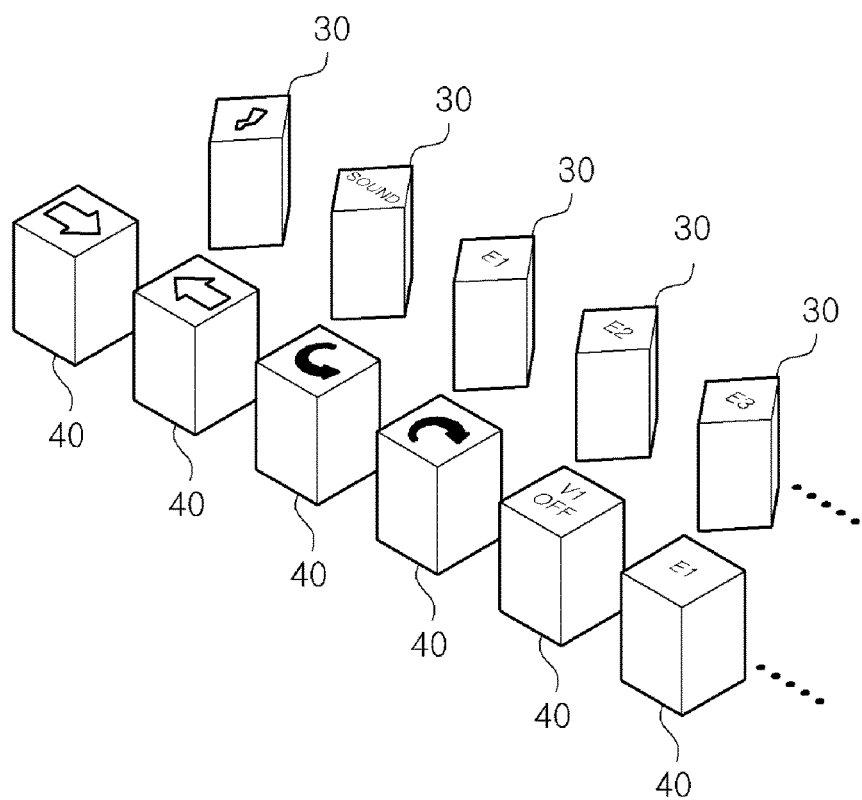
FIG. 5 is a view illustrating exemplary event blocks and exemplary execution blocks.

FIG. 5 is a view illustrating exemplary event blocks and exemplary execution blocks.

The event blocks 30 are columns having a diamond-shaped cross-section, and the execution blocks 40 are columns having a quadrangular cross-section, the shape of which differs from that of the event blocks.

Among the event blocks 30, for example, the event block 31 is used to input an event command "when light is detected," the event block 33 is used to input an event command "when detecting sound," the event block 35 is used to input an event command "when a command function E1 is generated," the event block 37 is used to input an event command "when a command function E2 is generated," and the event block 39 is used to input an event command "when a command function E3 is generated."

Among the execution blocks 40, for example, the execution block 41 is used to input an execution command "Move to the right," the execution block 42 is used to input an execution command "Move to the left," the execution block 43 is used to input an execution command "Turn to the left," the execution block 44 is used to input an execution command "Turn to the right," the execution block 45 is used to input an execution command "Turn off a variable area V1," and the execution block 46 is used to input an execution command "Execute the command function E1."

A text or an image indicating an event command or an execution command is marked on the front surface of each of the event blocks 30 and the execution blocks 40, thereby helping children to understand the event command or the execution command and compose an algorithm.

Figure 6:
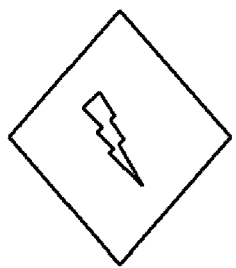
FIG. 6 illustrates an exemplary algorithm composed using the algorithm teaching apparatus according to the present disclosure.
Figure 6:
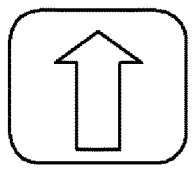
Figure 6:
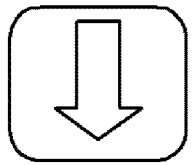

FIG. 6 illustrates an exemplary algorithm composed using the algorithm teaching apparatus according to the present disclosure.

Referring to FIG. 6, an event block for inputting an event command "when light is detected" is mounted to an event block mount, and an execution block for inputting an execution command "Move up" is mounted to an execution block mount of the execution area subordinate to the mounted event block.

An algorithm "Move up when light is detected" is composed by combining the event block and the execution block. Thus, when the robot detects light, the robot is controlled to move up.

Figure 7:
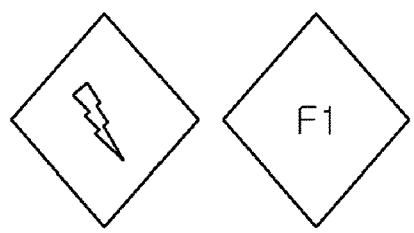
FIG. 7 illustrates another exemplary algorithm composed using the algorithm teaching apparatus according to the present disclosure.
Figure 7:
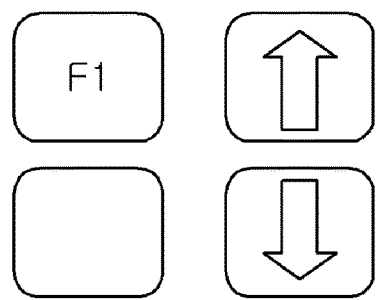

FIG. 7 illustrates another exemplary algorithm composed using the algorithm teaching apparatus according to the present disclosure.

Referring to FIG. 7, an event block for inputting an event command "when light is detected" is mounted to the first event block mount, and an event block for inputting an event command "when a command function F1 has occurred" is mounted to the second event block mount. An execution block for inputting an execution command "Execute the command function F1" is mounted to the first execution block mount of the execution area subordinate to the first event block mount. In the execution area subordinate to the second event block mount, an execution block for inputting an execution command "Move up" is mounted to the first execution block mount, and an execution block for inputting an execution command "Move down" is mounted to the second execution block mount.

Thus, through combining the event blocks and the execution blocks as described above, an algorithm "Execute the command function F1 when light is detected" and an algorithm "Move up and down when the command function F1 has occurred" are composed. When the robot detects light, the robot is controlled to move up and down.

Figure 8:
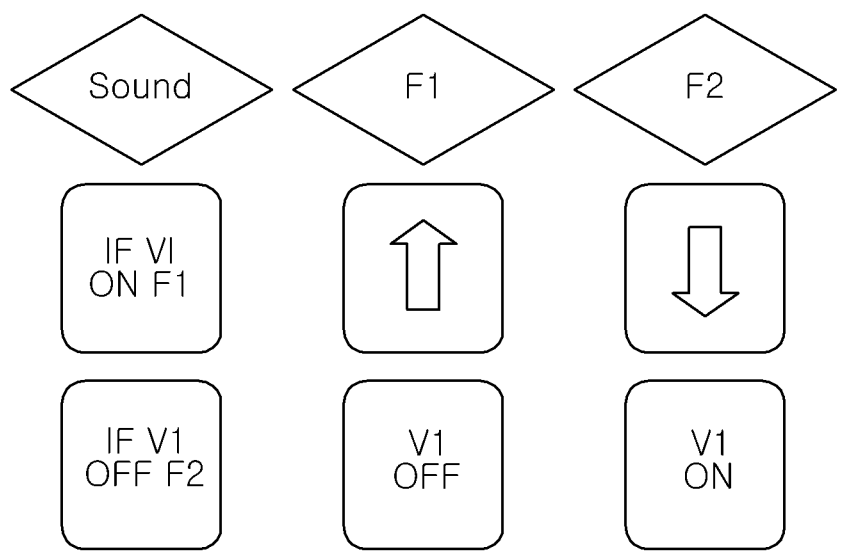
FIG. 8 illustrates a further exemplary algorithm composed using the algorithm teaching apparatus according to the present disclosure.

FIG. 8 illustrates a further exemplary algorithm composed using the algorithm teaching apparatus according to the present disclosure.

Referring to FIG. 8, an event block for inputting an event command "when sound is detected" is mounted to the first event block mount, an event block for inputting an event command "when a command function F1 has occurred" is mounted to the second event block mount, and an event block for inputting an event command "when a command function F2 has occurred" is mounted to the third event block mount.

An execution block for inputting an execution command "Execute F1 when a variable area V1 is on" is mounted to the first execution block mount of the execution area subordinate to the first event block mount, and an execution block for inputting an execution command "Execute F2 when a variable area V1 is off" is mounted to the second execution block mount of the execution area subordinate to the first event block mount.

In the execution area subordinate to the second event block mount, an execution block for inputting an execution command "Move up" is mounted to the first execution block mount, and an execution block for inputting an execution command "Turn off the variable area V1" is mounted to the second execution block mount.

In the execution area subordinate to the third event block mount, an execution block for inputting an execution command "Move down" is mounted to the first execution block mount, and an execution block for inputting an execution command "Turn on the variable area V1" is mounted to the second execution block mount.

Thus, through combining the event blocks and the execution blocks, an algorithm "Determine whether or not a variable area V1 is on when sound is detected, and execute a command function F1 when the variable area V1 is on. Determine whether or not the variable area V1 is off when sound is detected, and execute a command function F2 when the variable area V1 is off,"

an algorithm "Move up and turn off the variable area V1 when the command function F1 has occurred," and am an algorithm "Move down and turn on the variable area V1 when the command function F2 has occurred" are composed.

Thus, when the user claps in the on state of the variable area V1, the command function F1 is executed to move up the robot and switch the variable area V1 to an off state.

The above-described embodiments of the present disclosure can be recorded as programs that can be executed by a computer, and can be realized in a general purpose computer that executes the program using a computer readable storage medium.

Examples of the computer readable storage medium include a magnetic storage medium (e.g. a floppy disk or a hard disk), an optical storage medium (e.g. a compact disc read only memory (CD-ROM) or a digital versatile disc (DVD)), and a carrier wave (e.g. transmission through the Internet).

While the present disclosure has been described with reference to the certain exemplary embodiments shown in the drawings, these embodiments are illustrative only. Rather, it will be understood by a person skilled in the art that various modifications and equivalent other embodiments may be made therefrom. Therefore, the true scope of the present disclosure shall be defined by the concept of the appended claims.

The invention claimed is:

1. An algorithm teaching apparatus comprising:
   an algorithm creating section having an event block for inputting an event command and an execution block for inputting an execution command mounted thereto;
   an algorithm control section controlling a robot by recognizing a command code of the event block or the execution block mounted to the algorithm creating section and combining the event block and the execution block; and
   a communications section transmitting a control signal of the algorithm control section to the robot via a wired/wireless medium,
   wherein the algorithm creating section comprises:
   an event area having an event block mount to which the event block for inputting the event command is mounted; and
   an execution area having at least one execution block mount to which the execution block is mounted, the execution block inputting the execution command corresponding to the event command of the event block mounted to the event block mount, and
   wherein the execution block mount for inputting the execution command dependent on the event command of the event block mounted to the event block mount is allocated to the execution area, and
   the execution block mount is allocated to the execution area comprising at least one execution block mount.

2. The algorithm teaching apparatus according to claim 1, wherein the algorithm creating section further comprises a variable area to be activated in one of on and off states in order to realize a condition command, thereby displaying a condition.

3. The algorithm teaching apparatus according to claim 2, further comprising:
   the event block to be mounted to the event block mount of the algorithm creating section to input the event command; and
   the execution block to be mounted to the execution block mount of the algorithm creating section to input the execution command.

4. The algorithm teaching apparatus according to claim 1, wherein the event block mount has a first recess in which the event block is seated, and the execution block mount has a second recess in which the execution block is seated,
   the first recess and the second recess having different shapes such that the event block and the execution block having different shapes are seated therein.

5. The algorithm teaching apparatus according to claim 1, wherein
   the event block mount comprises an event block connector to which the event block is connected, the event block connector determining a mounting state of the event block or acquiring the event command from the event block, and
   the execution block mount comprises an execution block connector to which the execution block is connected, the execution block connector determining a mounting state of the execution block or acquiring the execution command from the execution block.

6. The algorithm teaching apparatus according to claim 1, wherein the algorithm control section comprises:
   a block-identifying section identifying the event block mounted to the event block mount or the execution block mounted to the execution block mount and dependent on the event block;

a command-recognizing section recognizing the event command of the identified event block or the execution command of the execution block dependent on the identified event block and mounted to the execution block mount; and an execution control section, wherein, when the event command of the identified event block has been satisfied, the execution control section generates a control signal and transmits the control signal to the robot such that the robot executes the execution command of the execution block dependent on the identified event block and mounted to the execution block mount.

7. The algorithm teaching apparatus according to claim 6, wherein the algorithm control section further comprises an operation state output section, wherein, when the event command or the execution command corresponding to the event command is executed, the operation state output section is synchronized with the event command or the execution command and sequentially activates the event block corresponding to the event command or the execution block corresponding to the execution command, thereby output-controlling an operating state of the event command or the execution command.

8. The algorithm teaching apparatus according to claim 1, further comprising:
the event block to be mounted to the event block mount of the algorithm creating section to input the event command; and
the execution block to be mounted to the execution block mount of the algorithm creating section to input the execution command.

9. The algorithm teaching apparatus according to claim 8, wherein
the event block has a text or an image marked on predetermined surfaces thereof, the text or the image corresponding to the event command, and
the execution block has a text or an image marked on predetermined surface thereof, the text or the image corresponding to the execution command.

10. An algorithm teaching apparatus comprising:
a body, wherein the body comprising: an algorithm creating section comprising an event area having an event block mount to which an event block is mounted and an execution area having an execution block mount to which an execution block for inputting an execution command corresponding to an event command of the event block is mounted; an algorithm control section controlling a robot by recognizing a command code of the event block mounted to the event block mount or a command code of the execution block mounted to the execution block mount and combining the event block and the execution block; and a communications section transmitting a control signal of the algorithm control section to the robot via a wired/wireless medium; and
algorithm blocks including the event block to be mounted to the event block mount to input the event command and the execution block to be mounted to the execution block mount to input the execution command,
wherein the execution block mount for inputting the execution command dependent on the event command of the event block mounted to the event block mount is allocated to the execution area, and
the execution block mount is allocated to the execution area comprising at least one execution block mount.

11. The algorithm teaching apparatus according to claim 10, wherein, when the event command or the execution command corresponding to the event command is executed, the algorithm control section is synchronized with the event command or the execution command and sequentially activates the event block corresponding to the event command or the execution block corresponding to the execution command, thereby output-controlling an operating state of the event command or the execution command.

12. The algorithm teaching apparatus according to claim 11, wherein the event block mount or the execution block mount comprises an output section synchronized with the event command or the execution command to output an operating state in response to the output-controlling of the algorithm control section, thereby allowing the operating state of the event command or the execution command to be visually determined.

13. The algorithm teaching apparatus according to claim 11, wherein the event block or the execution block comprises an output section to output an operating state in response to the output-controlling of the algorithm control section, thereby allowing the operating state of the event command or the execution command to be visually determined.

14. The algorithm teaching apparatus according to claim 11, wherein the event block or the execution block further comprises a user interface allowing a user command to be input.

15. An algorithm teaching apparatus comprising:
a robot;
a body, wherein the body comprising: an algorithm creating section comprising an event area having an event block mount to which an event block for inputting an event command is mounted and an execution area having an execution block mount to which an execution block for inputting an execution command corresponding to the event command of the event block is mounted; an algorithm control section controlling the robot by recognizing a command code of the event block mounted to the event block mount or a command code of the execution block mounted to the execution block mount and combining the event block and the execution block; and a communications section transmitting a control signal of the algorithm control section to the robot via a wired/wireless medium; and
algorithm blocks including the event block to be mounted to the event block mount to input the event command and the execution block to be mounted to the execution block mount to input the execution command,
wherein the execution block mount for inputting the execution command dependent on the event command of the event block mounted to the event block mount is allocated to the execution area, and
the execution block mount is allocated to the execution area comprising at least one execution block mount.

16. The algorithm teaching apparatus according to claim 15, wherein the robot comprises:
a sensor detecting the event command; and a driving unit realizing the execution command.

* * * * *